US012515456B2

(12) United States Patent
Takeda et al.

(10) Patent No.: US 12,515,456 B2
(45) Date of Patent: Jan. 6, 2026

(54) PRINTING APPARATUS

(71) Applicant: CANON KABUSHIKI KAISHA, Tokyo (JP)

(72) Inventors: Daiju Takeda, Kanagawa (JP); Hideaki Matsumura, Tokyo (JP); Tsuyoshi Saeki, Kanagawa (JP); Norio Sakurai, Tokyo (JP); Hiromasa Tsutsumi, Kanagawa (JP); Shota Asada, Tokyo (JP); Taiji Maruyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 18/477,381

(22) Filed: Sep. 28, 2023

(65) Prior Publication Data

US 2024/0109330 A1 Apr. 4, 2024

(30) Foreign Application Priority Data

Sep. 30, 2022 (JP) ................................ 2022-157212

(51) Int. Cl.
*B41J 2/175* (2006.01)
*B41J 2/135* (2006.01)

(52) U.S. Cl.
CPC ........... *B41J 2/17523* (2013.01); *B41J 2/135* (2013.01)

(58) Field of Classification Search
CPC ........ B41J 2/135; B41J 2/175; B41J 2/17509; B41J 2/1752; B41J 2/17523
See application file for complete search history.

(56) References Cited

U.S. PATENT DOCUMENTS

| | | | | |
|---|---|---|---|---|
| 4,760,409 A * | 7/1988 | Kiyohara | B41J 2/17523 | 347/86 |
| 4,908,638 A * | 3/1990 | Albosta | B41J 2/2132 | 347/22 |
| 6,003,981 A * | 12/1999 | Cameron | B41J 19/005 | 347/85 |
| 6,203,147 B1 * | 3/2001 | Battey | G03G 21/1889 | 347/86 |
| 6,863,388 B2 * | 3/2005 | Seino | B41J 2/17523 | 347/86 |

(Continued)

FOREIGN PATENT DOCUMENTS

| | | |
|---|---|---|
| JP | 2013202933 A | 10/2013 |
| JP | 2021138052 A | 9/2021 |

*Primary Examiner* — Anh T Vo
(74) *Attorney, Agent, or Firm* — Canon U.S.A., Inc. IP Division

(57) ABSTRACT

A printing apparatus includes a liquid tank unit, a printing head, and a supply tube unit. The liquid tank unit includes first and second liquid tanks that store liquid and are arranged in parallel to each other. The printing head ejects liquid from the first and second tanks while moving in a main scanning direction. The supply tube unit includes a first supply tube connecting the first liquid tank to the printing head and includes a second supply tube coupled in parallel to the first supply tube and connecting the second liquid tank to the printing head. The second supply tube transitions from a connected tube state in which the second and first supply tubes are coupled in parallel to a single tube state by being separated from the first supply tube, passes across the first supply tube, and is connected to a connection port of the second liquid tank.

22 Claims, 8 Drawing Sheets

(56) References Cited

U.S. PATENT DOCUMENTS

| | | | | |
|---|---|---|---|---|
| 8,297,745 | B2 * | 10/2012 | Lee | B41J 2/17509 347/85 |
| 8,596,771 | B2 * | 12/2013 | Takagi | B41J 2/1752 347/86 |
| 2022/0032636 | A1 * | 2/2022 | Tanaka | B41J 2/175 |

* cited by examiner

PRINTING APPARATUS

BACKGROUND

Field of the Disclosure

This disclosure relates to a printing apparatus.

Description of the Related Art

There is a printing apparatus which ejects liquid from a printing head and performs printing on a print medium, wherein a plurality of liquid tanks storing liquid and the printing head mounted on a carriage which moves reciprocally in a predetermined direction are connected to each other via a plurality of supply tubes which supply liquid.

In such a printing apparatus, in reciprocal movement of the carriage, each supply tube needs to bend and smoothly follow the reciprocal movement. On the other hand, since the repetition of the following by each supply tube may cause a kink, it is also necessary to reduce a load on each supply tube.

Under such circumstances, Japanese Patent Laid-Open No. 2021-138052 discloses a printing apparatus, wherein supply tubes are routed while they are arranged in parallel by a guide portion provided on the rear side of a liquid storage body (liquid tank unit).

In the printing apparatus of Japanese Patent Laid-Open No. 2021-138052, however, the flexibility in arrangement in the liquid storage body is reduced as the guide portion is provided on the rear side of the liquid storage body. In addition, there is a need for a space to arrange the guide portion inside the printing apparatus, which causes upsizing of the printing apparatus body.

SUMMARY

Accordingly, this disclosure aims to provide a high-reliability compact printing apparatus.

According to an aspect of the present disclosure, a printing apparatus includes a liquid tank unit including a first liquid tank configured to store liquid, and including a second liquid tank configured to store liquid and arranged in parallel to the first liquid tank, a printing head configured to eject liquid supplied from the first liquid tank and the second liquid tank while moving in a main scanning direction, and a supply tube unit including a first supply tube connecting the first liquid tank to the printing head and a second supply tube coupled in parallel to the first supply tube and connecting the second liquid tank to the printing head, wherein the second supply tube transitions from a connected tube state in which the second supply tube is coupled in parallel to the first supply tube to a single tube state by being separated from the first supply tube, passes across the first supply tube, and is connected to a connection port of the second liquid tank.

Further features of the present disclosure will become apparent from the following description of exemplary embodiments with reference to the attached drawings.

DESCRIPTION OF THE EMBODIMENTS

Figure 1:
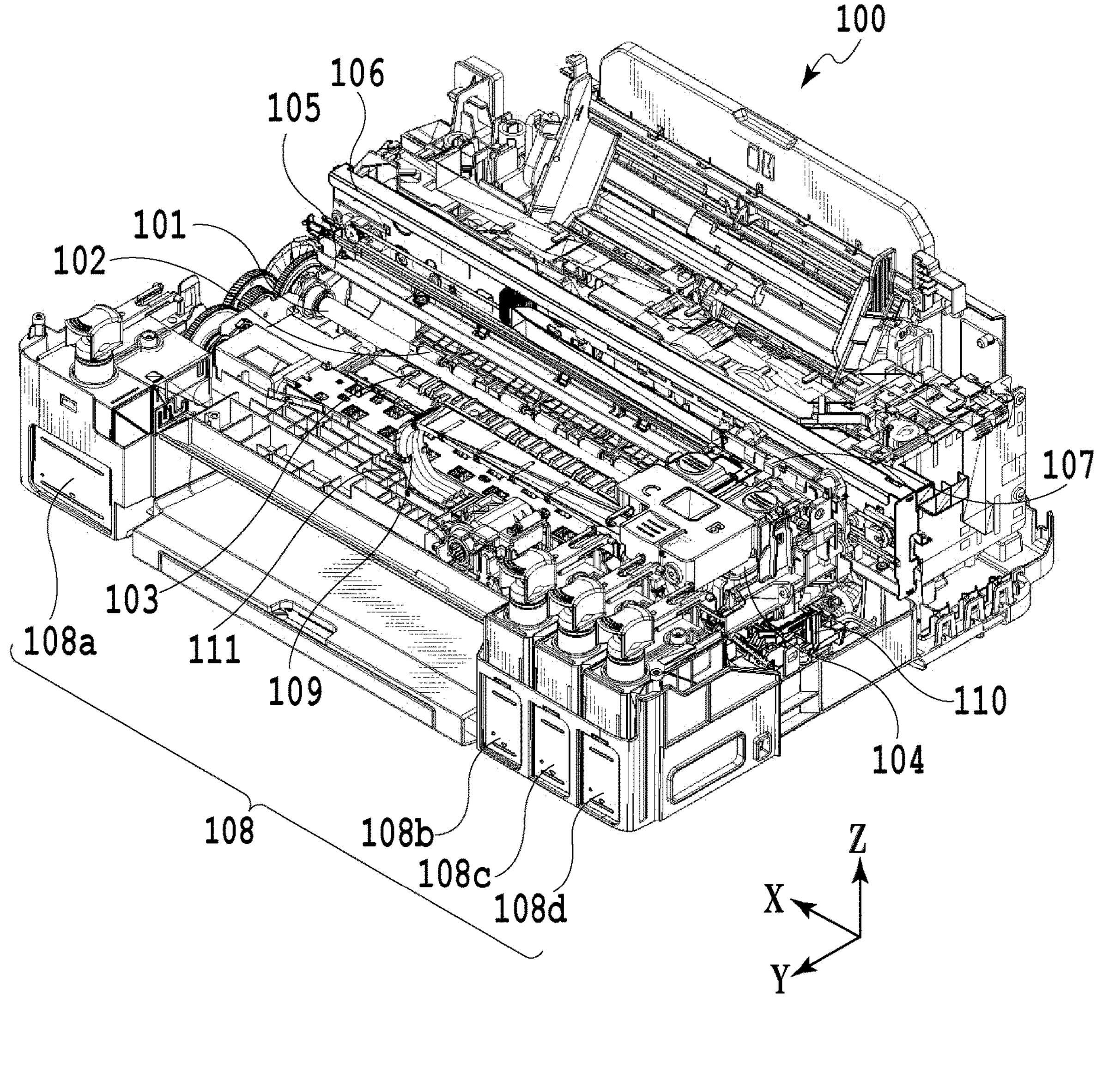
FIG. 1 is an internal configuration diagram of a printing apparatus in an embodiment.

Embodiments will be described below in detail with reference to the accompanying drawings. In the accompanying drawings, the same or similar feature is denoted by the same reference numeral and overlapping explanation is omitted.

In the following embodiments, a specific configuration of an inkjet printing head which ejects ink and an inkjet printing apparatus will be described, but the disclosure is not limited to this.

First Embodiment

[Overview of Printing Apparatus 100]

FIG. 1 is an internal configuration diagram of an inkjet printing apparatus (hereinafter referred to as a printing apparatus) in the present embodiment.

In each of the drawings attached hereto, an X direction indicates a width direction of a printing apparatus 100 and a Y direction indicates a depth direction of the printing apparatus 100. Incidentally, a side indicated by an arrow in the Y direction and the opposite side thereof will be referred to as "front side" and "back side," respectively, as appropriate. A Z direction indicates a height direction of the printing apparatus 100.

As shown in FIG. 1, the printing apparatus 100 comprises a conveying roller 101, a pinch roller 102, a platen 103, a printing head 104, a guide rail 105, and a chassis 106. The printing apparatus 100 further comprises a carriage 107, a liquid tank unit 108 including a plurality of liquid tanks, a supply tube unit 109 including a plurality of supply tubes, a recovery unit 110, and a housing section 111.

In printing, an unshown print medium (such as a cut sheet) is fed by an unshown sheet feeding roller. The print medium is pinched between the conveying roller 101 and the pinch roller 102 following the conveying roller 101. By the rotation of the conveying roller 101, the print medium is conveyed in the Y direction in the drawing while being guided to and supported on the platen 103. The conveying roller 101 is a metal roller processed to have minute undulations formed on its surface and produce a large friction force.

The pinch roller 102 is elastically biased against the conveying roller 101 by an unshown bias means such as a spring. The platen 103 supports the back side of the print medium so as to keep a constant or predetermined distance between a liquid ejection surface of the printing head 104 and the front side of the print medium facing the liquid ejection surface. After being conveyed to the platen 103, the print medium is pinched between an unshown discharge roller and a spur that is a rotating body following the discharge roller and conveyed. The discharge roller is a rubber roller having a high coefficient of friction. The spur is elastically biased against the discharge roller by an unshown bias means such as a spring. After image printing is performed, the print medium is discharged from above the platen 103 to the outside of the apparatus by the rotation of the discharge roller.

The printing head 104 is detachably mounted on the carriage 107 which is reciprocally moved by a drive means such as a motor along the guide rail 105 and the chassis 106 arranged below and above the carriage 107 in such a posture that the printing head 104 ejects liquid to the print medium. The carriage 107 moves in the X direction crossing the conveyance direction of the print medium (Y direction in the drawing). The moving direction of the carriage 107 is called a main scanning direction. In contrast, the conveyance direction of the print medium is called a sub-scanning direction.

The printing head 104 comprises a means for generating thermal energy (such as a heating resistance element) as energy used for liquid ejection especially in an inkjet printing system. The printing head 104 uses a system of creating a status change of liquid (film boiling) by the thermal energy and thereby achieves increase in density and resolution of printing. Incidentally, the system of creating a status change of liquid is not limited to such a system using thermal energy. As another example, the system may use vibrational energy. The printing head 104 is provided with a plurality of ejection opening arrays to eject different types of liquid (e.g., inks of different colors such as yellow, magenta, cyan, and black), respectively. In association with the colors of liquid ejected from the printing head 104, a plurality of individual liquid tank units 108 are fixed to the apparatus body.

In the present embodiment, the liquid tank unit 108 includes a liquid tank 108*a*, a liquid tank 108*b*, a liquid tank 108*c*, and a liquid tank 108*d*. The liquid tanks in the liquid tank unit 108 can store different types of liquid. As a matter of course, the same type of liquid may be stored as necessary. For example, the liquid tank 108*a* stores a black ink. The liquid tank 108*b* stores a cyan ink. The liquid tank 108*c* stores a magenta ink. The liquid tank 108*d* stores a yellow ink.

The liquid tank unit 108 and the printing head 104 are connected by an unshown joint by the supply tube unit 109 corresponding to the liquid colors. This makes it possible to supply separately a liquid of the type stored in each liquid tank to an ejection opening array of the printing head 104 corresponding to that type. In addition, in a non-printing area that is within the range of reciprocal movement of the printing head 104 and is out of the range of passage of a print medium at the time of conveyance, the recovery unit 110 is arranged to face the liquid ejection surface of the printing head 104.

The recovery unit 110 comprises a cap section to cap the liquid ejection surface of the printing head 104 and a suction mechanism to suck liquid forcibly from the printing head 104 with the liquid ejection surface capped. The recovery unit 110 further comprises a cleaning blade or the like to wipe dirt off the liquid ejection surface.

The housing section 111 is provided to extend above and across the conveyance path of a print medium in the main scanning direction and suppresses the supply tubes from contacting a print medium while supporting the moving supply tube unit 109. In the present embodiment, one end of each supply tube in the supply tube unit 109 is connected to the corresponding liquid tank in the liquid tank unit 108.

The other end of each supply tube in the supply tube unit 109 is mounted on the carriage 107 and connected to the printing head 104. The supply tube unit 109 includes a plurality of tubes that bend according to the movement of the carriage 107 in the main scanning direction.

[Supply Tube]

Figure 2A:
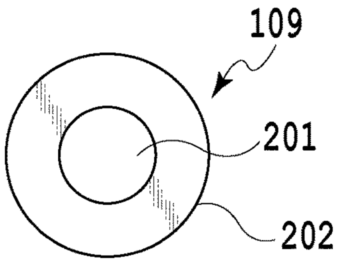
FIGS. 2A to 2C are schematic views showing an example of supply tubes in an embodiment.
Figure 2B:
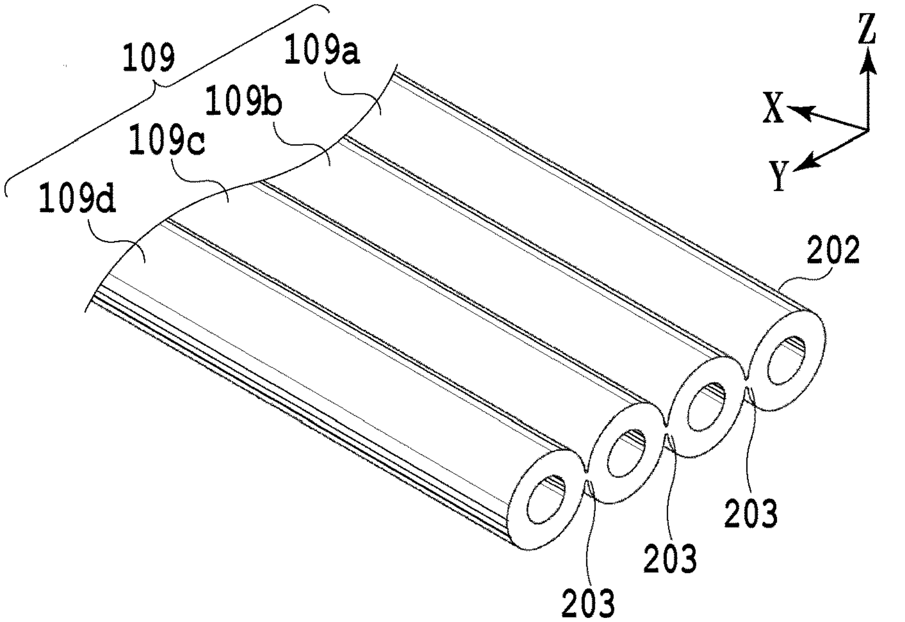
Figure 2C:
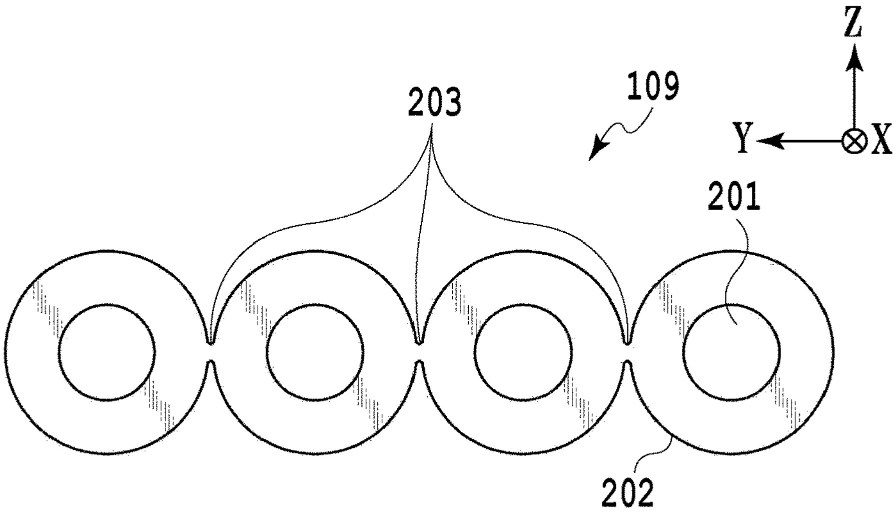

FIGS. 2A to 2C are schematic views showing an example of the supply tubes in the present embodiment.

FIG. 2A is a diagram showing the cross section of the supply tube in a single tube state included in the supply tube unit 109 in the present embodiment. For convenience of explanation, a state in which the supply tubes are singly separated will be referred to as "single tube state." As shown in FIG. 2A, a flow path 201 through which liquid flows is formed in an inner wall section of the supply tube. The supply tube also comprises an outer wall section 202.

FIG. 2B is a diagram showing the supply tubes in a connected tube state included in the supply tube unit 109 in the present embodiment. For convenience of explanation, a state in which the supply tubes are coupled in parallel will be referred to as "connected tube state." As shown in FIG. 2B, the supply tube unit 109 includes a supply tube 109*a*, a supply tube 109*b*, a supply tube 109*c*, and a supply tube 109*d*. The outer wall section 202 of each supply tube is provided with a joint 203. In the present embodiment, parts of the outer wall sections 202 of the supply tubes in the single tube state are connected in parallel via the joints 203, whereby the supply tube unit 109 in the connected tube state is integrally formed.

FIG. 2C is a cross-sectional view of the supply tube unit in the connected tube state shown in FIG. 2B. As shown in FIG. 2C, each joint 203 in the present embodiment is provided between two adjacent outer wall sections 202.

[Liquid Tank Unit 108]

Figure 3:
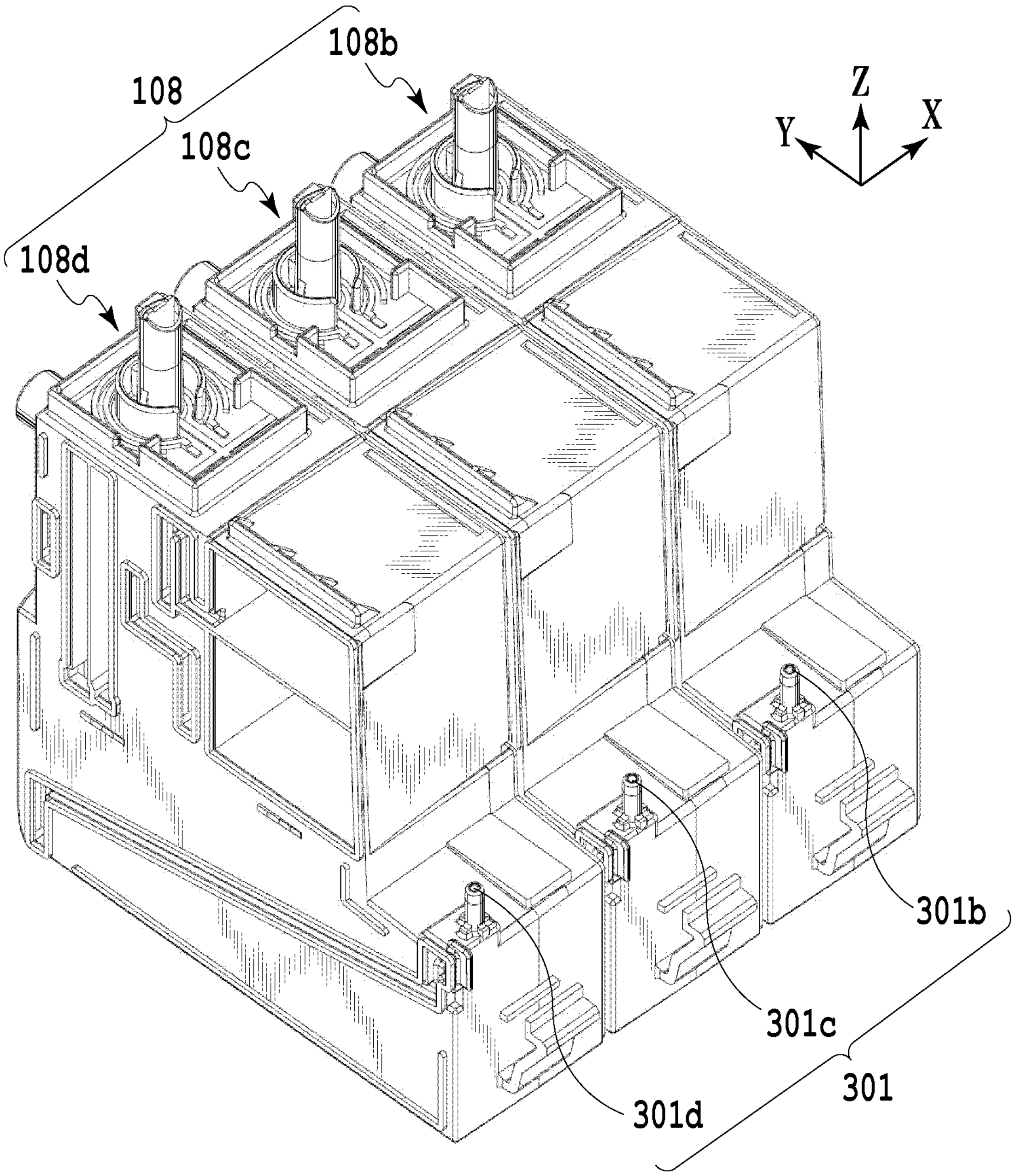
FIG. 3 is a schematic view of a liquid tank unit in an embodiment.

FIG. 3 is a schematic view of the liquid tank unit 108 in the present embodiment.

The liquid tank unit 108 includes a liquid tank 108*b*, a liquid tank 108*c*, and a liquid tank 108*d* capable of storing liquid and arranged in parallel in the X direction. In the liquid tanks 108*b* to 108*d*, connection ports 301*b* to 301*d* extending in the Z direction (antigravity direction) are integrally molded, respectively. By integrally molding each liquid tank and the connection port in that liquid tank, the number of parts can be reduced as compared with a case where they are separately molded.

[Supply Path]

Figure 4:
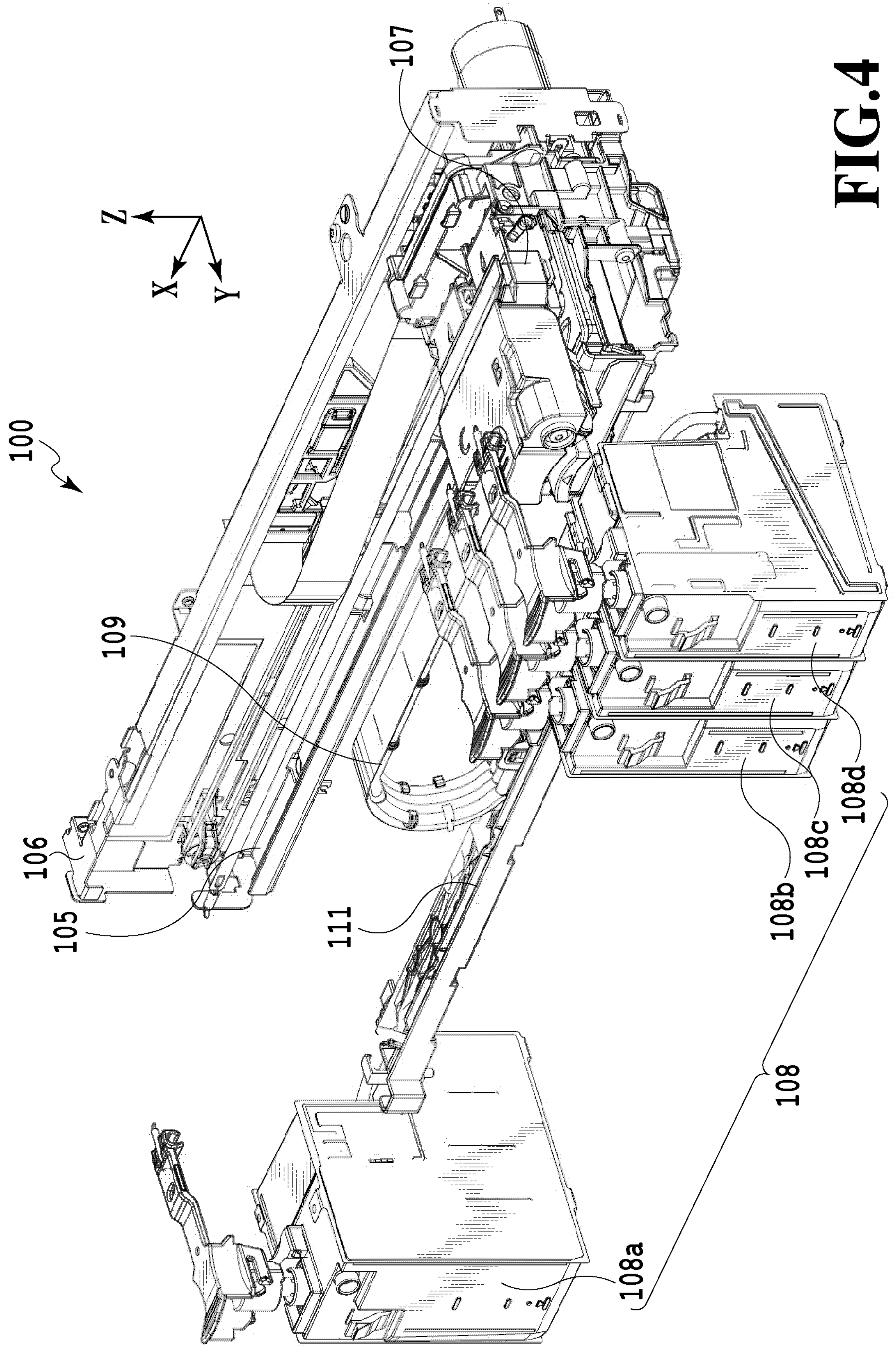
FIG. 4 is a schematic view of a supply path in an embodiment.

FIG. 4 is a schematic view of a supply path including the liquid tank unit 108 in the present embodiment.

Of the features of the printing apparatus 100 shown in FIG. 1, FIG. 4 mainly shows the chassis 106, the carriage 107, the liquid tank unit 108, the supply tube unit 109, and the housing section 111.

As shown in FIG. 4, four liquid tanks are arranged in the present embodiment. More specifically, the liquid tank 108*a* is arranged at the left in the drawing. On the other hand, the liquid tank 108*b*, the liquid tank 108*c*, and the liquid tank 108*d*, which are each smaller than the liquid tank 108*a*, are arranged at the right in the drawing. This arrangement can achieve a balance between the left and right weights in the printing apparatus 100.

In the present embodiment, the supply tube unit 109 including the plurality of tubes is placed on the housing section 111. The supply tube unit 109 is routed in a substantially U shape tilted in the main scanning direction (horizontal direction) when viewed from the front of the apparatus body such that a mounting section 501 (see FIG. 5) in which the supply tube unit 109 is connected to the carriage 107 is located above the connection ports 301 (see FIG. 3). In short, the supply tube unit 109 is routed to bend up from the liquid tank unit 108 toward the carriage 107.

Figure 5:
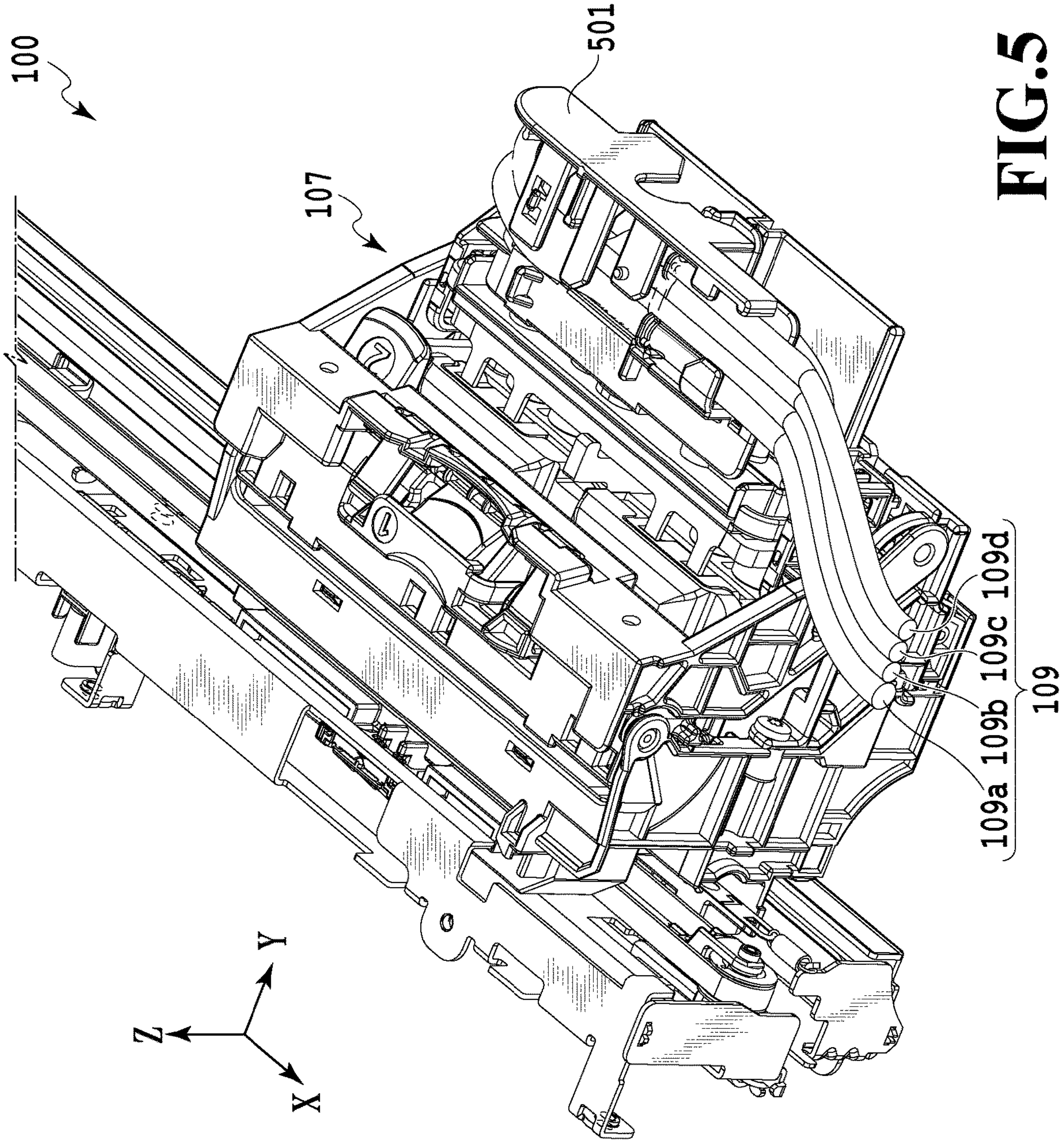
FIG. 5 is a schematic perspective view showing an example of a carriage in an embodiment.

FIG. 5 is a schematic perspective view showing an example of the carriage 107 in the present embodiment. The printing head 104 (see FIG. 1) is connected to the other end (the end opposite to one end connected to the liquid tank) of each of the first supply tube, second supply tube, third supply tube, and fourth supply tube.

The printing head 104 (see FIG. 1) can eject liquid while reciprocally moving in the main scanning direction (the X direction in the drawing) in which a scan is performed. The carriage 107, which reciprocally moves in the main scanning direction with the printing head 104 mounted thereon, comprises the mounting section 501 on which the other ends of the supply tube unit 109 in the connected tube state are mounted. The other ends of the supply tube unit 109 are mounted on the mounting section 501 of the carriage 107 in the connected tube state. Accordingly, in a case where the carriage 107 moves reciprocally, the supply tube unit 109 follows the reciprocal movement of the carriage 107 while bending in the connected tube state.

[Regulation of Movement of Supply Tube]

Figure 6A:
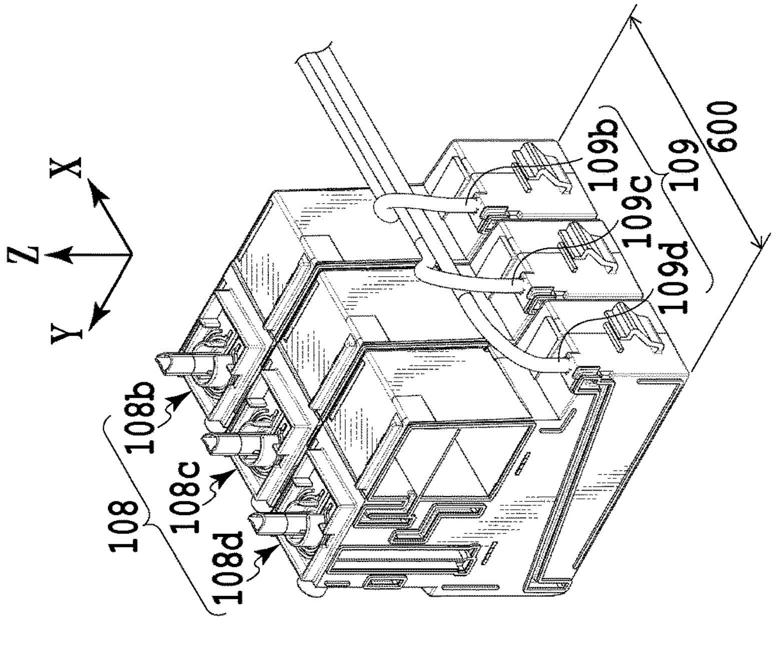
FIGS. 6A to 6C are diagrams showing an example of a configuration on a rear side of a liquid tank unit in an embodiment.
Figure 6B:
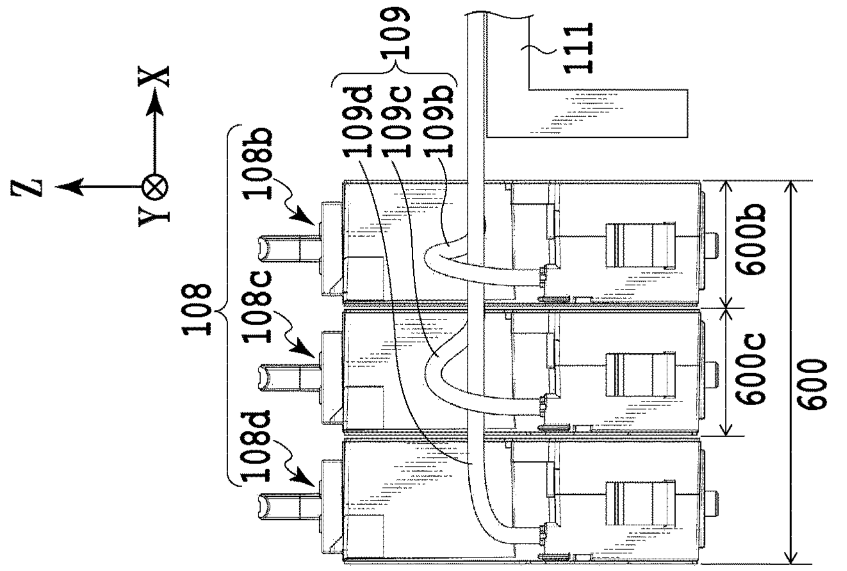
Figure 6C:
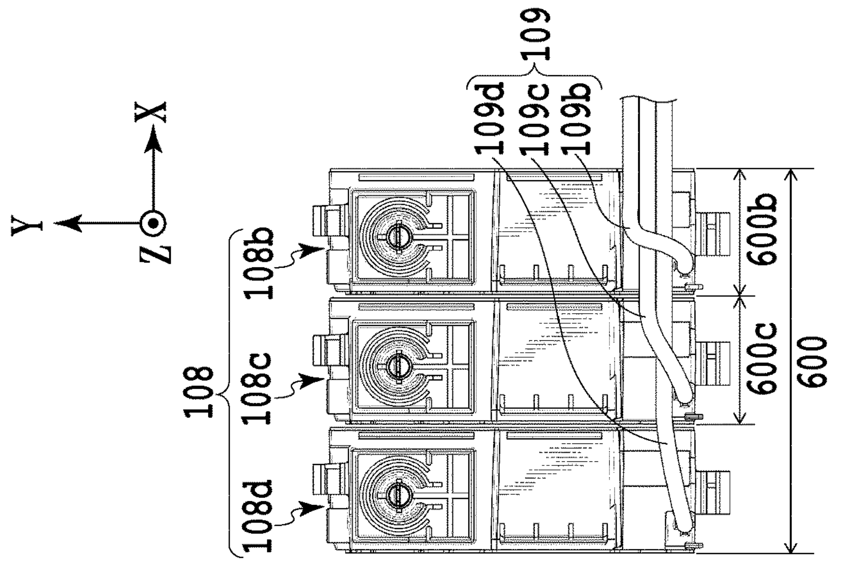

FIGS. 6A to 6C are diagrams showing an example of a configuration on a rear side of the liquid tank unit 108 in the present embodiment. FIG. 6A is a schematic perspective view of the rear side of the liquid tank unit 108 in the present embodiment. FIG. 6B is a diagram showing FIG. 6A from the Y direction. FIG. 6C is a diagram showing FIG. 6A from the Z direction.

In a case where the supply tubes are in the single tube state, since their rigidity is lower than that in the connected tube state, the supply paths may deviate from ideal paths. For example, this corresponds to a case where the supply tube accidentally contacts the liquid tank at the time of assembly and the supply tube is kept at the liquid tank by a friction force. There is also a possibility that the supply tube is stretched and the length of the supply tube is changed. Further, the supply tube may be kinked, which may result in a liquid supply failure. Additionally, the supply tube may be disconnected from the connection port of the liquid tank and cause liquid leakage.

To avoid the above matters, it is considered that a dedicated member to guide the supply tubes (such as a guide member) is provided near the connection ports in the liquid tanks. However, providing the dedicated member causes not only a decrease in flexibility of arrangement of the liquid tanks but also an increase in the number of parts. Thus, in the present embodiment, the movement of the supply tube unit 109 is regulated without any dedicated member.

FIGS. 6A to 6C are diagrams illustrating the details of the state of connection between the supply tubes 109*b* to 109*d* and the liquid tanks 108*b* to 108*d* in the present embodiment. As has been explained with reference to FIG. 3, in the liquid tanks 108*b* to 108*d* are formed the respective connection ports 301*b* to 301*d* extending in the antigravity direction. The connection ports 301*b* to 301*d* are connected to the supply tubes 109*b* to 109*d* having flexibility, respectively. In other words, the supply tubes 109*b* to 109*d* are connected to the connection ports 301*b* to 301*d*, respectively, in the single tube state such that their openings are oriented in the direction of gravity. On the other hand, the supply tubes 109*b* to 109*d* are joined in parallel in the housing section 111. That is, the supply tubes 109*b* to 109*d* transition from the connected tube state to the single tube state from the housing section 111 to the connection ports 301*b* to 301*d*.

The state of each supply tube in a path from the housing section 111 to the connection with the connection port 301 will be described. The supply tube 109*b* in the connected tube state is separated from the other two tubes in an area of a width 600*b* of the liquid tank 108*b*, transitioned from the connected tube state to the single tube state, and connected to the connection port 301*b*. At this time, the supply tube 109*b* transitioned to the single tube state passes above and across the supply tubes 109*c* and 109*d* in the connected tube state and is connected to the connection port 301*b*. That is, a position where each of the supply tube 109*c* and the supply tube 109*b* is transitioned from the connected tube state to the single tube state is within an area of the width of the liquid tank unit 108 in a direction in which the liquid tank 108*b*, the liquid tank 108*c*, and the liquid tank 108*d* are arranged in parallel.

As a result, the movement of the supply tube 109*c* and supply tube 109*d* extending laterally is regulated in the X, Y, and Z directions.

On the other hand, the supply tube 109*c* and the supply tube 109*d* are separated in an area of a width 600*c* of the liquid tank 108*c*, transitioned from the connected tube state to the single tube state, and connected to the connection port 301*c* and the connection port 301*d*, respectively. In this case, the supply tube 109*c* transitioned to the single tube state passes above and across the supply tube 109*d* also transitioned to the single tube state and is connected to the connection port 301*c*. As a result, the movement of the supply tube 109*d* extending laterally is regulated in the X, Y, and Z directions.

[Conclusion]

According to the above configuration, since the plurality of supply tubes included in the supply tube unit are in the connected tube state in an area other than the proximity of the liquid tank unit and printing head, the rigidity is improved as compared with the single tube state. Accordingly, the supply tube unit having the plurality of supply tubes joined in parallel is less prone to bending and the movement thereof is more regulated than the supply tubes in the single tube state. Therefore, the position where the supply tube unit is arranged can be easily maintained in the printing apparatus.

Further, according to the arrangement of the supply tube unit in the present embodiment, one supply tube passes above and across the other supply tube(s) near the connection port and regulates the movement of the other supply tube(s). This removes the necessity of a dedicated member like the guide section in Patent Literature 1. Accordingly, the flexibility in arrangement in the liquid tank unit can be increased and the printing apparatus body can be downsized. Further, according to this arrangement, the other tube(s) can be suppressed from being disconnected from the connection ports of the liquid tanks. This can suppress a collision of the other supply tubes with the carriage moving reciprocally above the liquid tank unit and thereby suppress a collision of the entire supply tube unit with the carriage.

Therefore, according to the technique of this disclosure, a high-reliability compact printing apparatus can be provided.

Second Embodiment

The present embodiment will be described below. In the following description, differences from the first embodiment will be mainly explained; the same features as those of the first embodiment will be denoted by the same reference numerals and descriptions thereof will be omitted. The present embodiment aims to provide a printing apparatus more reliable than the first embodiment.

Regulating Section 700

Figure 7A:
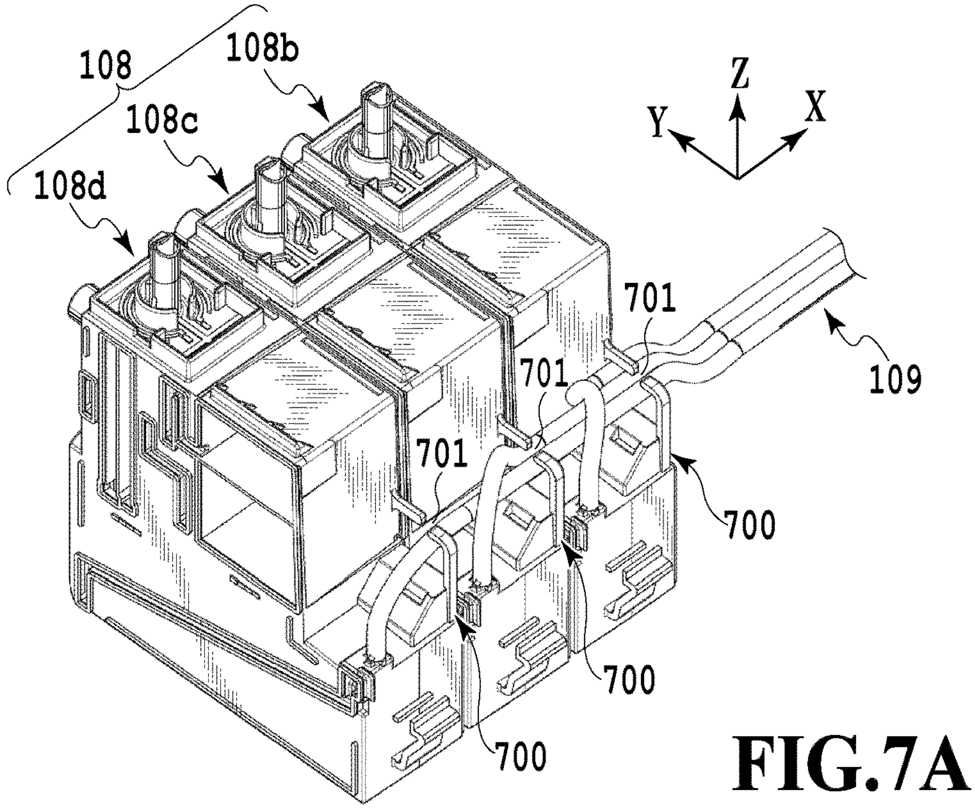
FIGS. 7A and 7B are diagrams showing an example of a configuration on a rear side of a liquid tank unit in an embodiment.
Figure 7B:
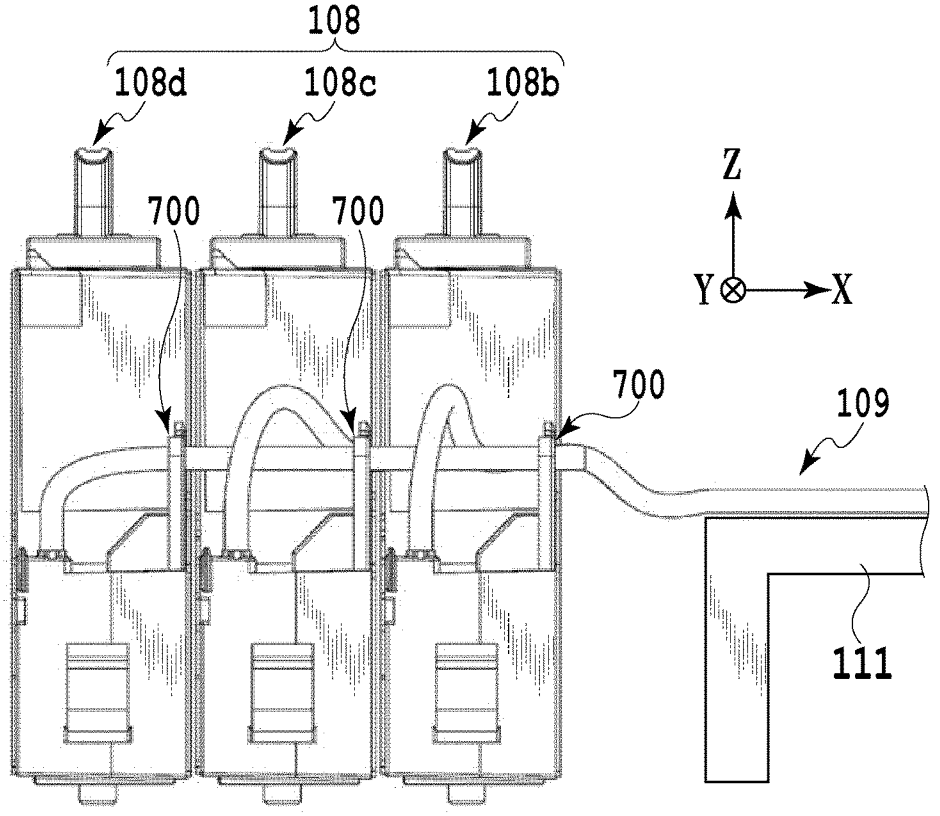

FIGS. 7A and 7B are diagrams showing an example of a configuration of the rear side of the liquid tank unit 108 in the present embodiment. FIG. 7A is an external perspective view of the liquid tank unit 108 and the supply tube unit 109 in the present embodiment. FIG. 7B is a diagram of the liquid tank 108*b* shown in FIG. 7A viewed from the Y axis direction. For convenience of explanation, FIG. 7B shows the housing section 111 not illustrated in FIG. 7A.

As shown in FIG. 7A, on the rear side of the liquid tank unit 108 of the present embodiment, a frame-shaped regulating section 700 to regulate the movement of the supply tube unit 109 is integrally molded at a position lower than an upper surface of the rear side of the liquid tank unit 108.

The regulating section 700 has a break 701 formed to cut off a part of the frame. At the time of assembly of the printing apparatus, the supply tube unit 109 is elastically deformed and inserted into the frame through the break 701 in the regulating section 700 molded integrally with the liquid tank 108*b*. After the supply tube unit 109 is inserted through the break 701, the regulating section 700 regulates the movement of the supply tube unit 109 to the outside of the frame.

According to the above configuration, the supply tube unit 109 can be suppressed from moving to a position higher than the upper surface of the liquid tank unit 108.

As shown in FIG. 7B, the height of the supply tube unit 109 on the rear side of the liquid tank unit 108 may be different from the height of the housing section 111. In this case, the supply tube unit 109 may float up due to its elasticity. In a case where the supply tube unit 109 floats above the height of the liquid tank unit 108, it may contact the carriage 107 (not shown here) which makes a scan above the liquid tank unit 108. Accordingly, the liquid tank unit 108 of the present embodiment is provided with the regulating section 700 which regulates the movement of the supply tube unit 109 above (the Z direction in the drawing) the upper surface of the liquid tank unit 108.

Figure 8A:
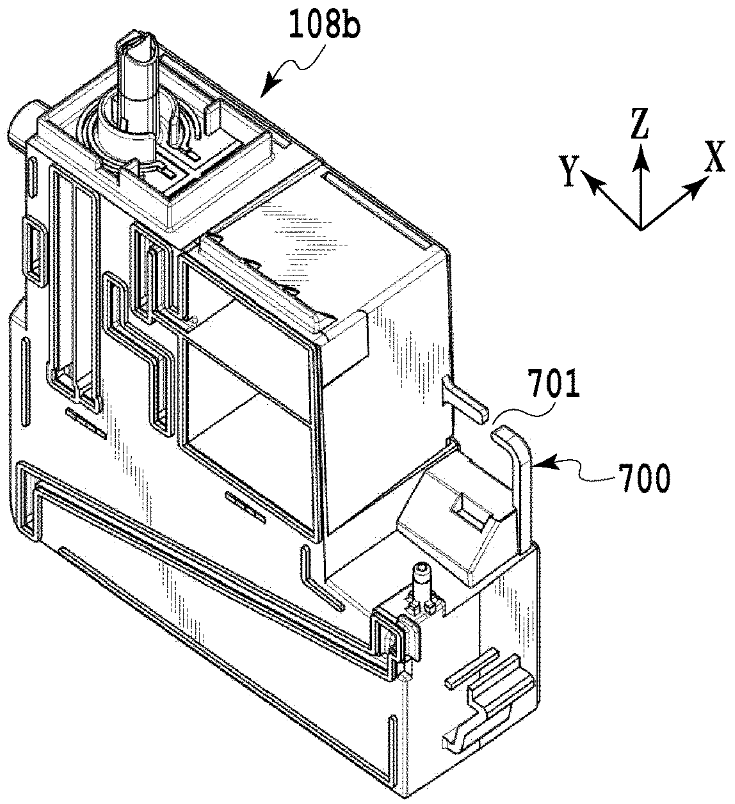
FIGS. 8A and 8B are diagrams showing an example of a regulating section in an embodiment.
Figure 8B:
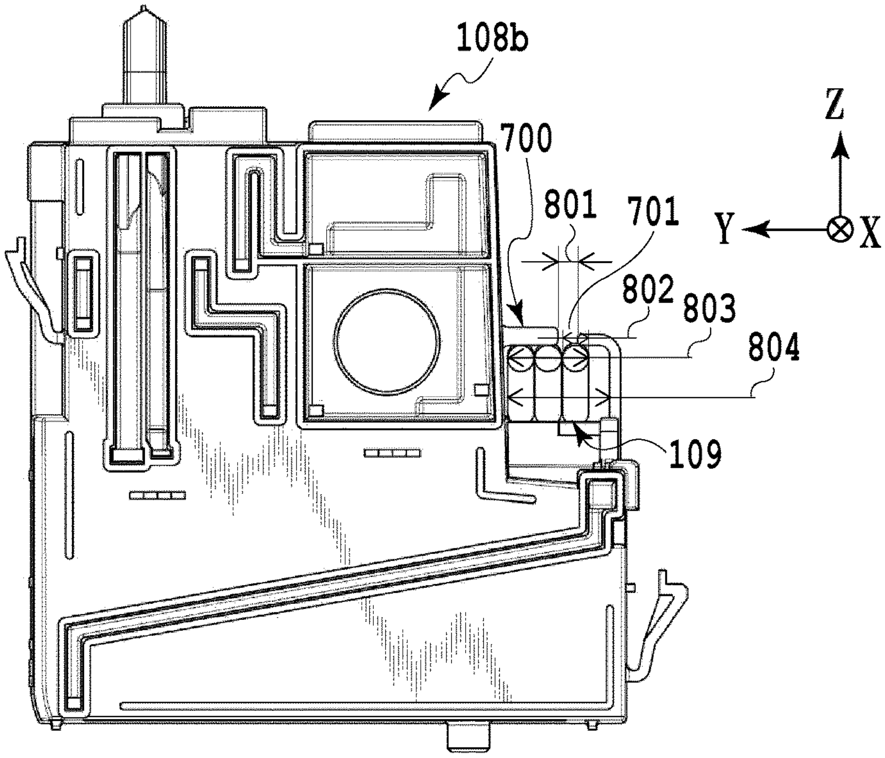

FIGS. 8A and 8B are diagrams showing an example of the regulating section 700 in the present embodiment. FIG. 8A is a schematic external perspective view of the liquid tank 108*b* in the present embodiment. As shown in FIG. 8A, the regulating section 700 described above is molded integrally with the liquid tank 108*b*.

FIG. 8B is a diagram showing a state in which the supply tubes are arranged in the connected tube state in a case where the liquid tank 108*b* shown in FIG. 8A is viewed from the X axis direction. As shown in FIG. 8B, the regulating section 700 is molded such that a width 801 of the break 701 is less than a diameter 802 of the supply tube in the single tube state.

An internal length 804 of the regulating section 700 is greater than a width 803 of the supply tube unit 109 in the connected tube state (here, a length corresponding to the sum of the diameters of the three supply tubes). In the present embodiment, in a case where the supply tube unit 109 is provided, the supply tube unit 109 is passed through the break 701 while being elastically deformed and then pushed from the outside to the inside of the regulating section 700. After that, the supply tube unit 109 returns to its original shape inside the regulating section 700.

Therefore, after the supply tube unit 109 passes through the break 701, the supply tube unit 109 will not go out of the regulating section 700 unless an external force is applied to elastically deform the supply tube unit 109 again. According to this configuration, the supply tube unit 109 can be arranged such that the supply tube unit 109 is movable within the regulating section 700, while the supply tube unit 109 is prevented from going out of the regulating section 700.

Therefore, according to the regulating section 700 of the present embodiment, the supply tube unit 109 can be kept at a position lower than the height of the liquid tank unit 108 more easily than the first embodiment. Therefore, according to the printing apparatus of the present embodiment, a printing apparatus more reliable than the first embodiment can be provided.

Other Embodiment

In the embodiments described above, the supply tubes are transitioned from the single tube state to the connected tube state by coupling two adjacent supply tubes in parallel via a joint. As another example, a binding means such as a clip may be used to transition each supply tube from the single tube state to the connected tube state. For example, the supply tube 109*c* may be coupled in parallel to the supply tube 109*d* by being clipped in an area of a width 600 of the liquid tank unit 108. Further, the supply tube 109*b* may be coupled in parallel to the supply tube 109*d* and the supply tube 109*c* by being clipped in the area of the width 600 of the liquid tank unit 108. Incidentally, "coupling in parallel" in this disclosure is not limited to a state in which a plurality of tubes is joined in one direction as shown in FIG. 2B. Three or more tubes may be coupled in a bundle.

In the embodiments described above, each of the number of liquid tanks and the number of supply tubes is four. The number of liquid tanks and the number of supply tubes are not limited to four as long as one supply tube is arranged to regulate the movement of the other supply tube(s) in an area of a width of a liquid tank unit in which two or more liquid tanks are arrayed. That is, it is only necessary that each of the number of liquid tanks and the number of supply tubes be more than one provided that the above condition is satisfied.

According to the technique of this disclosure, a high-reliability compact printing apparatus can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-157212, filed Sep. 30, 2022, which is hereby incorporated by reference wherein in its entirety.

What is claimed is:

1. A printing apparatus comprising:

a liquid tank unit including a first liquid tank configured to store liquid, and including a second liquid tank configured to store liquid and arranged in parallel to the first liquid tank;

a printing head configured to eject liquid supplied from the first liquid tank and the second liquid tank while moving in a main scanning direction; and a supply tube unit including a first supply tube connecting the first liquid tank to the printing head and a second supply tube coupled in parallel to the first supply tube and connecting the second liquid tank to the printing head, wherein the second supply tube includes a portion that is in a connected tube state in which the second supply tube is coupled in parallel to the first supply tube, and includes a portion that is in a single tube state in which the second supply tube is separated from the first supply tube, wherein the second supply tube passes across the first supply tube, and is connected to a connection port of the second liquid tank, and wherein, in a first direction intersecting with a gravity direction, the connection port of the second liquid tank, the first supply tube in the tube state, and the second supply tube in the connected tube state are arranged in this order.

2. The printing apparatus according to claim 1, wherein the connection port of the second liquid tank extends in an antigravity direction, and the second supply tube passes above and across the first supply tube and is connected to the connection port of the second liquid tank.

3. The printing apparatus according to claim 1, wherein the supply tube unit is capable of bending following reciprocal movement of the printing head.

4. The printing apparatus according to claim 1, wherein the second supply tube transitions from the connected tube state to the single tube state in an area on which a surface of the second liquid tank provided with the connection port of the second liquid tank is projected in a vertical direction.

5. The printing apparatus according to claim 1, wherein the second supply tube is coupled in parallel to the first supply tube by a clip.

6. The printing apparatus according to claim 1, wherein the second supply tube is coupled in parallel to the first supply tube by joining outer walls.

7. The printing apparatus according to claim 1, wherein a connection port of the first liquid tank is molded integrally with the first liquid tank, and the connection port of the second liquid tank is molded integrally with the second liquid tank.

8. The printing apparatus according to claim 1, wherein the first liquid tank and the second liquid tank are configured to store different types of liquid.

9. The printing apparatus according to claim 1, wherein the liquid tank unit further includes a third liquid tank capable of storing liquid and arranged in parallel to the second liquid tank, wherein the printing head is capable of ejecting liquid supplied from the third liquid tank while moving in the main scanning direction, wherein the supply tube unit further includes a third supply tube coupled in parallel to the first supply tube and the second supply tube and connecting the third liquid tank to the printing head, and wherein the third supply tube transitions from a third supply connected tube state in which the third supply tube is coupled in parallel to the first supply tube and the second supply tube to a third supply single tube state by being separated from the first supply tube and the second supply tube, passes across the first supply tube and the second supply tube, and is connected to a connection port of the third liquid tank.

10. The printing apparatus according to claim 9, wherein the connection port of the third liquid tank extends in an antigravity direction, and the third supply tube passes above and across the second supply tube and is connected to the connection port of the third liquid tank.

11. The printing apparatus according to claim 9, wherein the third supply tube transitions from the third supply connected tube state to the third supply single tube state in an area on which a surface of the third liquid tank provided with the connection port of the third liquid tank is projected in a vertical direction.

12. The printing apparatus according to claim 9, wherein the third supply tube is coupled in parallel to the first supply tube and the second supply tube by a clip.

13. The printing apparatus according to claim 9, wherein the third supply tube is coupled in parallel to the first supply tube and the second supply tube by joining outer walls.

14. The printing apparatus according to claim 9, wherein the connection port of the third liquid tank is molded integrally with the third liquid tank.

15. The printing apparatus according to claim 9, wherein the third liquid tank is configured to store a type of liquid different from liquid stored in the first liquid tank and liquid stored the second liquid tank.

16. The printing apparatus according to claim 1, wherein a frame-shaped regulating section capable of regulating movement of the supply tube unit is molded integrally with the liquid tank unit.

17. The printing apparatus according to claim 16, wherein the frame-shaped regulating section has a break having a width less than a diameter of each of the first supply tube and the second supply tube such that the supply tube unit can be elastically deformed and inserted into the break.

18. The printing apparatus according to claim 1, wherein the second supply tube passes across the first supply tube when viewed from a top of the printing apparatus.

19. The printing apparatus according to claim 1, wherein the second supply tube passes across the first supply tube when viewed from a front of the printing apparatus.

20. The printing apparatus according to claim 1, wherein the second supply tube passes above and across the first supply tube when viewed from a front or a top of the printing apparatus, and regulates a movement of the first supply tube.

21. The printing apparatus according to claim 1, wherein the first supply tube in the connected tube state and the second supply tube in the connected tube state are arranged in the first direction.

22. The printing apparatus according to claim 1, wherein the first direction indicates a depth direction of the printing apparatus.

* * * * *